(12) United States Patent
Leon

(10) Patent No.: US 7,085,725 B1
(45) Date of Patent: Aug. 1, 2006

(54) METHODS OF DISTRIBUTING POSTAGE LABEL SHEETS WITH SECURITY FEATURES

(75) Inventor: JP Leon, Tucson, CA (US)

(73) Assignee: Neopost Inc., Hayward, CA (US)

( * ) Notice: Subject to any disclaimer, the term of this patent is extended or adjusted under 35 U.S.C. 154(b) by 614 days.

(21) Appl. No.: 09/708,975

(22) Filed: Nov. 7, 2000

Related U.S. Application Data

(60) Provisional application No. 60/216,778, filed on Jul. 7, 2000.

(51) Int. Cl.
*G06Q 99/00* (2006.01)
*G06Q 30/00* (2006.01)

(52) U.S. Cl. .......................... 705/1; 705/408
(58) Field of Classification Search .................... 705/1, 705/401–402, 410, 14, 408
See application file for complete search history.

(56) References Cited

U.S. PATENT DOCUMENTS

| | | |
|---|---|---|
| 4,447,890 A | 5/1984 | Duwel et al. |
| 4,657,697 A | 4/1987 | Chiang |
| 4,725,718 A | 2/1988 | Sansone et al. |
| 4,743,747 A | 5/1988 | Fougere et al. |
| 4,757,537 A | 7/1988 | Edelmann et al. |
| 4,775,246 A | 10/1988 | Edelmann et al. |
| 4,812,994 A | 3/1989 | Taylor et al. |
| 4,813,912 A | 3/1989 | Chickneas et al. |
| 4,831,555 A | 5/1989 | Sansone et al. |
| 4,853,865 A | 8/1989 | Sansone et al. |
| 4,853,961 A | 8/1989 | Pastor |
| 4,949,381 A | 8/1990 | Pastor |
| 5,142,577 A | 8/1992 | Pastor |
| 5,181,245 A | 1/1993 | Jones |
| 5,224,046 A | 6/1993 | Kim et al. |
| 5,231,668 A | 7/1993 | Kravitz |
| 5,280,531 A | 1/1994 | Hunter |
| 5,377,268 A | 12/1994 | Hunter |
| 5,448,641 A | 9/1995 | Pintsov et al. |
| 5,625,694 A | 4/1997 | Lee et al. |
| 5,638,442 A | 6/1997 | Gargiulo et al. |
| 5,666,421 A | 9/1997 | Pastor et al. |
| 5,688,056 A | 11/1997 | Peyret |
| 5,710,884 A | 1/1998 | Dedrick |

(Continued)

FOREIGN PATENT DOCUMENTS

EP   825 565 A2   2/1998

(Continued)

OTHER PUBLICATIONS

"Information-Based Indicia Program (IBIP), Performance Criteria for Information-Based Indicia and Security Architecture for Closed IBI Postage Metering System (PCIBI-C)" Jan. 12, 1999, United States Postal Service, dated Jan. 12, 1999.

"Information Based Indicia Program (IBIP) Indicium Specification," United States Postal Service, dated Jun. 13, 1996.

(Continued)

*Primary Examiner*—John W. Hayes
*Assistant Examiner*—Fadey Jabr
(74) *Attorney, Agent, or Firm*—Townsend and Townsend and Crew LLP

(57) ABSTRACT

A method of providing a value stamp over a communication network includes providing a medium to a user having access to a data processing system. The medium is suitable for printing a value indicium thereon and has an identifier code that identifies the medium. The identifier code of the medium to be used to purchase a value stamp is received from the user. The identifier code is used to decide whether or not to perform an action.

18 Claims, 10 Drawing Sheets

U.S. PATENT DOCUMENTS

| | | | |
|---|---|---|---|
| 5,715,164 A | 2/1998 | Liechti et al. | |
| 5,742,683 A | 4/1998 | Lee et al. | |
| 5,781,438 A | 7/1998 | Lee et al. | |
| 5,791,991 A | 8/1998 | Small | |
| 5,793,867 A | 8/1998 | Cordery et al. | |
| 5,819,241 A | 10/1998 | Reiter | |
| 5,822,738 A | 10/1998 | Shah et al. | |
| 5,920,850 A | 7/1999 | Hunter et al. | |
| 5,963,928 A | 10/1999 | Lee | |
| 6,244,763 B1 * | 6/2001 | Miller | 400/76 |
| 6,505,179 B1 * | 1/2003 | Kara | 705/50 |

FOREIGN PATENT DOCUMENTS

| | | |
|---|---|---|
| EP | 845 762 A2 | 6/1998 |
| EP | 1022688 A2 * | 7/2000 |
| GB | 1 536 403 | 12/1978 |
| WO | WO 98/13790 A1 | 4/1998 |
| WO | WO 98/20461 A2 | 5/1998 |
| WO | WO 00/49580 A1 | 8/2000 |

OTHER PUBLICATIONS

Information Based Indicia Program Postal Security Device Specification, United States Postal Service, dated Jun. 13, 1996.

"Information Based Indicia Program Host System Specification [Draft]," United States Postal Service, dated Oct. 9, 1996.

"Information-Based Indicia Program (IBIP), Performance Criteria for Information-Based Indicia and Security Architecture for IBI Postage Metering Systems (PCIBISAIBIPMS)," United States Postal Service, dated Aug. 19, 1998.

United States Postal Service, "Performance Criteria For Information-Based Indicia And Security Architecture For Open IBI Postage Evidencing Systems," Information Based Indicia Program (IBIP), Jun. 25, 1999 XP-002161216.

Barker-Benfield, "First Union Offers Online Transactions," *Florida Times-Union*, Jan. 28, 1994.

FIBS PUB 140-1, Federal Information Processing Standards Publication, (Jan. 11, 1994) Security Requirements for Cryptographic Modules, U.S. Department of Commerce, Ronald H. Brown, Secretary, National Institute of Standards and Technology; pp. 1-51.

* cited by examiner

METHODS OF DISTRIBUTING POSTAGE LABEL SHEETS WITH SECURITY FEATURES

CROSS-REFERENCE TO RELATED APPLICATIONS

This application claims priority from Application No. 60/216,778, filed Jul. 7, 2000, entitled "A Method and System for Dispensing Postage over the Internet with Enhanced Postal Security Features," the entire disclosure of which, including all attachments and appendices, is incorporated by reference in their entirety for all purposes.

The following pending U.S. applications, including all attachments and appendices, are incorporated by reference in their entirety for all purposes:

(1) U.S. Non-Provisional patent application Ser. No. 09/611,375, entitled "Providing Stamps On Secure Paper Using A Communications Network," filed Jul. 7, 2000;

(2) U.S. Provisional Patent Application No. 60/216,779, entitled "System And Method Of Printing Labels," filed Jul. 7, 2000;

(3) U.S. Provisional Patent Application No. 60/216,653, entitled "Method And System For Dispensing Postage Over The Internet, With Enhanced Postal Security Features" filed Jul. 7, 2000;

(4) U.S. Provisional Patent Application No. 60/206,207, entitled "Providing Stamps on Secure Paper Using A Communications Network" filed May 22, 2000;

(5) U.S. Provisional Patent Application No. 60/204,357, entitled "Stamps Over a Communications Network" filed May 15, 2000;

(6) U.S. Provisional Patent Application No. 60/181,299, entitled "System and Method For Stamps Over The Internet," filed Feb. 9, 2000;

(7) U.S. Provisional Patent Application No. 60/181,368, entitled "System and Method For Stamps Over The Internet," filed Feb. 8, 2000;

(8) U.S. Provisional Patent Application No. 60/165,885, entitled "System And Method For Managing Multiple Postage Functions In A Single Account," filed Nov. 16, 1999;

(9) U.S. Provisional Patent Application No. 60/164,639, entitled "System and Method For Dispensing Postage Over The Internet, With Enhanced Postal Security Features," filed Nov. 10, 1999; and

(10) U.S. Non-Provisional patent application Ser. No. 09/358,801, entitled "Method And Apparatus For Postage Label Authentication," filed Jul. 21, 1999.

The following patent applications, including the present application, are being filed concurrently, and the disclosure of each other application is herein incorporated by reference in its entirety for all purposes:

(1) U.S. Non-Provisional patent application Ser. No. 09/708,883, entitled "Techniques For Dispensing Postage Using A Communication Network";

(2) U.S. Non-Provisional patent application Ser. No. 09/708,913, entitled "Method And Apparatus For Providing Postage Indicia Over A Data Communication Network";

(3) U.S. Non-Provisional patent application Ser. No. 09/708,698, entitled "System And Method For Managing Multiple Postage Functions In A Single Account";

(4) U.S. Non-Provisional patent application Ser. No. 09/708,975, entitled "Method Of Distributing Postage Label Sheets With Security Features"

(5) U.S. Non-Provisional patent application Ser. No. 09/708,792, entitled "Targeted Advertisement Using A Security Feature On A Postage Medium";

(6) U.S. Non-Provisional patent application Ser. No. 09/708,185, entitled "System And Method Of Printing Labels"; and (7) U.S. Non-Provisional patent application Ser. No. 09/708,701, entitled "Providing Stamps On Secure Paper Using A Communications Network".

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

BACKGROUND OF THE INVENTION

The present invention relates generally to methods of providing postage stamps over a communication network, and more particularly to methods of distributing postage label sheets to the public.

Traditionally, consumers could purchase postage or stamps only from special locations designated by a postal authority. For example, in the U.S., consumers could buy postage only from post offices or other centers specifically authorized by the United States Postal Service (USPS) to sell postage. A disadvantage of this traditional postage buying method is that a consumer has to spend the time and make to effort to physically travel to the post office to buy postage.

In order to alleviate the inconveniences associated with traditional techniques described above, postal authorities such as the USPS, now allow postage to be printed by electromechanical postage meters which can be placed at the consumers' or users' premises. Such postage meters can be leased, rented, or purchased where allowed, from the postal authority or from vendors, such as Neopost™, who have been authorized by the postal authority to sell the meters. Typically, the user purchases a fixed amount of postage value beforehand and the meter is programmed with this amount. Subsequently, the user is allowed to print postage up to the programmed amount. The meter typically includes a print mechanism and mechanical arrangements and/or electronic control circuitry that direct the operation of the print mechanism.

Because the meter is capable of printing postage having a value, the postal authority generally mandates that, in order to maintain security of the postal funds, the postage meters be acquired and used/handled according to strict, complex, and often bureaucratic regulations imposed by the postal authority. For example, a special meter agreement has to be signed between the meter vendor and the user before the meter can be rented or leased by the user. The user also has to secure a postal license number from a postal authority and the meter has to be seeded with the postal license number. A postal license number is usually associated with a geographical address of a user and is used by the postal authority to track the location of the postage meter and its user. A user using postage meters at multiple geographical addresses has to secure multiple postal licenses, one for each address. Additionally, before a new meter is put into service, the meter has to be inspected and sealed by postal authority personnel. Once in service, each meter has to be periodically inspected by postal authority representatives. Further, postal regulations mandate that the postage meter itself incorporate a variety of security features thereby increasing the costs associated with acquiring and using the meter. As a result, renting or leasing, and subsequently using a postal meter can often be expensive, inconvenient, and involve many bureaucratic hurdles. Consequently, it is quite impractical for individual users to use postage meters.

With a view towards alleviating some of the above-mentioned problems and making use of advances in electronics and communications, the United States Postal Service (USPS) has promulgated specifications for its Information Based Indicia Program (IBIP). The IBIP program supports new methods of applying postage in lieu of conventional approaches that typically rely on the use of a postage meter mechanically printing the indicium on mail pieces.

The IBIP program contemplates postal indicia printed by conventional printers (e.g., thermal, inkjet, or laser) and including human-readable and machine-readable portions. An indicium refers to the imprinted designation or a postage mark used on mail pieces denoting evidence of postage payment. The machine-readable portion was initially specified to be a two-dimensional barcode symbology known as PDF417. The indicium content includes a digital signature for security reasons (to preclude forgery). There are separate specifications for open and closed systems.

The specifications have been updated over the last few years; the recent specifications for open and closed systems are:

Information-Based Indicia Program (IBIP) Performance Criteria for Information-Based Indicia and Security Architecture for Open IBI Postage Evidencing Systems (PCIBI-O) (Draft Feb. 23, 2000), and Information-Based Indicia Program (IBIP) Performance Criteria for Information-Based Indicia and Security Architecture for Closed IBI Postage Metering Systems (PCIBI-C) (Draft Jan. 12, 1999).

These specifications are herein incorporated by reference in their entirety for all purposes.

An open system is defined as a general purpose computer used for printing information-based indicia, but not dedicated to the printing of those indicia. A closed system is defined as a system whose basic components are dedicated to the production of information-based indicia and related functions, that is, a device dedicated to creating indicia similar to an existing, traditional postage meter. A closed system may be a proprietary device used alone or in conjunction with other closely related, specialized equipment, and includes the indicium print mechanism.

The IBIP program specifies a postal security device (PSD) that manages the secure postage registers and performs the cryptographic operations of creating and verifying digital signatures.

The open system specification describes a host system (a computer or postage meter) connected to an unsecured printer (e.g., a laser printer or the like) and a PSD. The host system also provides communication facilities that allow the PSD's vendor and/or the USPS to establish communications with the PSD. Communications supported include troubleshooting, accounting transactions, and the like.

The PSD and host cooperate to provide an indicium, which is then transmitted to and printed by the unsecured printer. The specified indicium allows the use of an unsecured printer (e.g., thermal, inkjet, or laser) by using a digital signature, which also supports authentication of the mail piece. The indicium includes human-readable information and machine-readable information (initially specified as a PDF417 two-dimensional bar code). Each PSD is a unique security device, having core security functions such as digital signature generation and verification and secure management of information (e.g., descending and ascending registers).

Several techniques have been developed, based on the IBIP program, to streamline and simplify the use of postage meters while providing the required security. For example, U.S. Pat. No. 6,005,945 (Whitehouse) discloses a system for electronic distribution of postage using a secure central computer which generates the postal indicia in response to postage requests submitted by end user computers. However, these conventional techniques, including the system described in the Whitehouse patent, still require the user to apply for and obtain a postal license number from a postal authority. Further, since a postal license is associated with a particular address, if the user wants to purchase postage from more than one address, the user has to secure multiple postal license numbers, one for each address. As a result, a user still has to suffer the inconveniences and bureaucratic hurdles of obtaining postal license numbers. Further, since the issuance of postal licenses may take several days or even weeks, valuable time is wasted before a user can make use of services provided by a postage vendor. Thus, even though electronic postage distribution techniques based upon the IBIP program have reduced inconveniences associated with traditional postage meters, they are still significantly unwieldy.

In light of the above, there is a need for techniques which allow a user to buy postage without suffering the inconveniences described above. It is further desirable that the techniques be operable in a distributed environment and make use of communication networks such as the Internet.

SUMMARY OF THE INVENTION

In present invention provides methods of providing a postage stamp over a communication network. In one embodiment, a method of providing a value stamp over a network includes providing a medium to a user having access to a data processing system. The medium is suitable for printing a value indicium thereon and has an identifier code that identifies the medium. The identifier code of the medium to be used to purchase a value stamp is received from the user. The identifier code is used to decide whether or not to perform an action.

A further understanding of the nature and advantages of the present invention may be realized by reference to the remaining portions of the specification and the attached drawings.

DESCRIPTION OF THE SPECIFIC EMBODIMENTS

Figure 1:
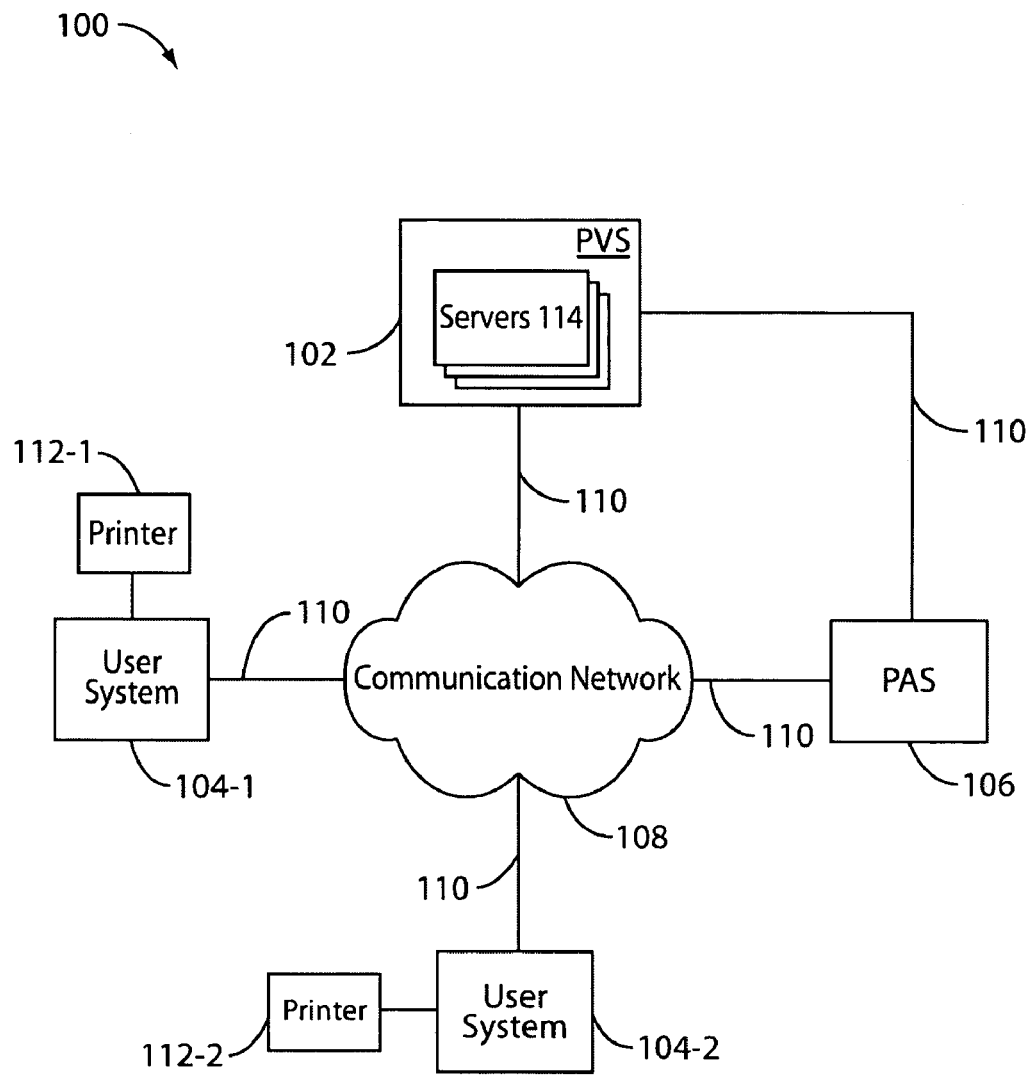
FIG. 1 is a simplified block diagram of a distributed computer network which may incorporate an embodiment of the present invention.

The present invention provides techniques for dispensing postage using a communication network such as the Internet. FIG. 1 is a simplified block diagram of a distributed computer network 100 which may incorporate an embodiment of the present invention. Computer network 100 includes one or more user computer systems 104-1 and 104-2, at least one postage vendor system (PVS) 102, and a postal authority system (PAS) 106 coupled to a communication network 108 via a plurality of communication links 110. User systems 104 may optionally be coupled to one or more printers 112 or other like printing devices, and other peripheral devices (not shown) such as a weighing scale.

Communication network 108 provides a mechanism for allowing the various components of distributed network 100 to communicate and exchange information with each other. Communication network 108 may itself be comprised of many interconnected computer systems and communication links. Communication links 18 may be hardwire links, optical links, satellite or other wireless communications links, wave propagation links, or any other mechanisms for communication of information. While in one embodiment communication network 108 is the Internet, in other embodiments, communication network 108 may be any suitable computer network. Distributed computer network 100 depicted in FIG. 1 is merely illustrative of an embodiment incorporating the present invention and does not limit the scope of the invention as recited in the claims. One of ordinary skill in the art would recognize other variations, modifications, and alternatives. For example, more than one PVS 102 may be coupled to communication network 108. Further, one or more printers 112 may optionally be coupled to a single user system 104, or alternatively a plurality of user systems 104 may share one or more common printers. Other devices such as weighing machines for weighing mail pieces, fax machines, scanners, etc. may also be coupled to user systems 104.

User systems 104 allow users of the present invention, for example, postage consumers, to interact with and buy postage from PVS 102. These users may include one or more human beings interacting with an user system 104, one or more processes executing on user system 104 or systems coupled to user systems 104, devices coupled to user system 104, or other entities capable of interacting with PVS 102. Various different types of interactions with PVS 102 are facilitated by user systems 104. For example, users may use user systems 104 to configure requests to purchase postage from PVS 102. These user purchase requests are then communicated from user systems 104 to PVS 102 via communication network 108. In response to the user requests, user systems 104 may receive information for printing indicia (or a single indicium) from PVS 102. A user may then use user system 104 to print the indicia using printer devices coupled to or accessible to user system 104. The indicia may be printed on labels, on paper, on the mail pieces themselves, or on other like media. In alternative embodiments of the present invention, a user using user system 104 may store the information for printing indicia received from PVS 102 on a storage medium, such as a computer disk, for subsequent printing of the indicia.

Users may also use user systems 104 to perform other activities such as browse web-pages stored by PVS 102, register as users of services provided by PVS 102, provide financial and credit information for consummating commercial transactions with PVS 102, review status of user accounts if such accounts are maintained by PVS 102, review postage purchase history, access help or customer services provided by PVS 102, and to perform other like activities. Accordingly, in a client-server environment, user system 104 typically operates as a client requesting information from PVS 102 which operates as a server which performs processing in response to the client request and provides the requested information to the client systems. It should be however apparent that a particular user system 104 may act both as a client or a server depending on whether the user system is requesting or providing information.

As stated above, a user may use user system 104 to browse or interact with web pages provided by PVS 102. These web pages may be stored by one or more web servers in PVS 102 and may be accessed by users of user system 104 via a browser program executing on user system 104. Examples of browser programs include the Internet Explorer browser program provided by Microsoft Corporation, the Netscape Navigator browser provided by Netscape Corporation, and others. In the Internet and World Wide Web (the "Web") environment, the web pages may be written in Hypertext Markup Language (HTML) and may incorporate any combination of text, graphics, audio and video content, software programs, and other data. Web pages may also contain hypertext links to other web pages. Each web page is uniquely identified by an address called a Uniform Resource Locator (URL) that enables users to access the web page. Users may access web pages by providing URL information to the browser, either directly or indirectly, and in response, a web page corresponding to the user-specified URL is downloaded from a server coupled to communication network 108 to the requesting user computer 104. The downloaded web page may then be viewed by the user using the browser.

According to the teachings of the present invention, PVS 102 is responsible for dispensing postage to users in response to postage purchase requests received from user systems 104. As shown in FIG. 1, PVS 102 may itself be comprised of multiple interconnected computer and server systems 114 and communication links, as will be described below. PVS 102 may be configured to receive postage requests from user systems 104, validate the postage requests, generate information for printing indicia in response to the postage requests, perform security functions related to the postage transaction, manage funds related to the postage transaction, communicate the information for printing the indicia to the requesting user systems 104, maintain users accounts, and several other functions. These functions are generally performed by software code modules executed by PVS 102. However, it should be apparent that these functions may be also performed by software modules or hardware modules of PVS 102, or combinations thereof.

According to an embodiment of the present invention, the information for printing indicia generated by PVS 102 is generally along the lines specified by the IBIP specifications published by the United States Postal Service (USPS). As indicated above, the IBIP specifications propose new methods for generating postage which will make use of technological advances in the fields of computers and communication networks while enhancing the security of the postage. These methods are supposed to retrofit and augment existing postage meters using new technology known as information-based indicia.

According to the teachings of the present invention, the security-critical functions performed by PVS 102 as part of generating the information for printing the indicia comply with the security-critical functions performed by the Postal Security Device (PSD) described in the IBIP specifications. PVS 102 may also be configured to perform functions performed by the Host System described in the IBIP specifications. The entire contents of the IBIP specifications are herein incorporated by reference for all purposes. Further, details regarding the functions performed by PVS 102 are provided below.

According to the teachings of the present invention, a single postal license number is assigned to each PVS 102 by a postal authority such as the USPS. PVS 102 uses the single postal license number to cater to postage requests from a plurality of unrelated users who may be at different geographical addresses. Thus, according to the present invention, a single postal license number is effectively shared between a plurality of users who may have different geographical addresses. This is substantially different from conventional postage vending techniques wherein a user is required to apply for and receive at least one unique postal license number. This is the case even if the postage indicium was generated by a central computer, for example, as discussed in U.S. Pat. No. 6,005,945 (Whitehouse). Accordingly, the present invention provides a level of postage buying convenience heretofore not achieved by conventional techniques. Since the postal license number is associated with PVS 102 rather than with the user, the user is shielded from the procedural steps required for obtaining the postal license number. In fact, according to the present invention, the consumer of the postage does not even have to be aware of the postal license number. A user may buy postage by simply sending a postage request to PVS 102 and receiving information for printing one or more indicia corresponding to the request from PVS 102.

Referring back to FIG. 1, postal authority system (PAS) 106 may comprise one or more computer systems managed by a postal authority authorized to regulate and control all postal matters. Examples of postal authorities include the United States Postal Service (USPS), France's La Poste, UK's Royal Mail, and others. In most instances, the postal authority is a governmental or quasi-governmental agency authorized to oversee postal matters. PAS 106 may be coupled to PVS 102 via communication network 108 or directly via some other communication link 110. The information exchanged between PVS 102 and PAS 106 may include finance information, information required by the postal authority for audit purposes, status information, security information, and other like information. The information required by the postal authority for audit purposes may include information identifying the postage buyers, the postage value and amount purchased by the buyers, and other information. PVS 102 may be configured to download information to PAS 106 on a periodic basis using batch processing, or upon the occurrence of certain events. PVS 102 may also be configured to purchase postage from PAS 106.

Figure 2:
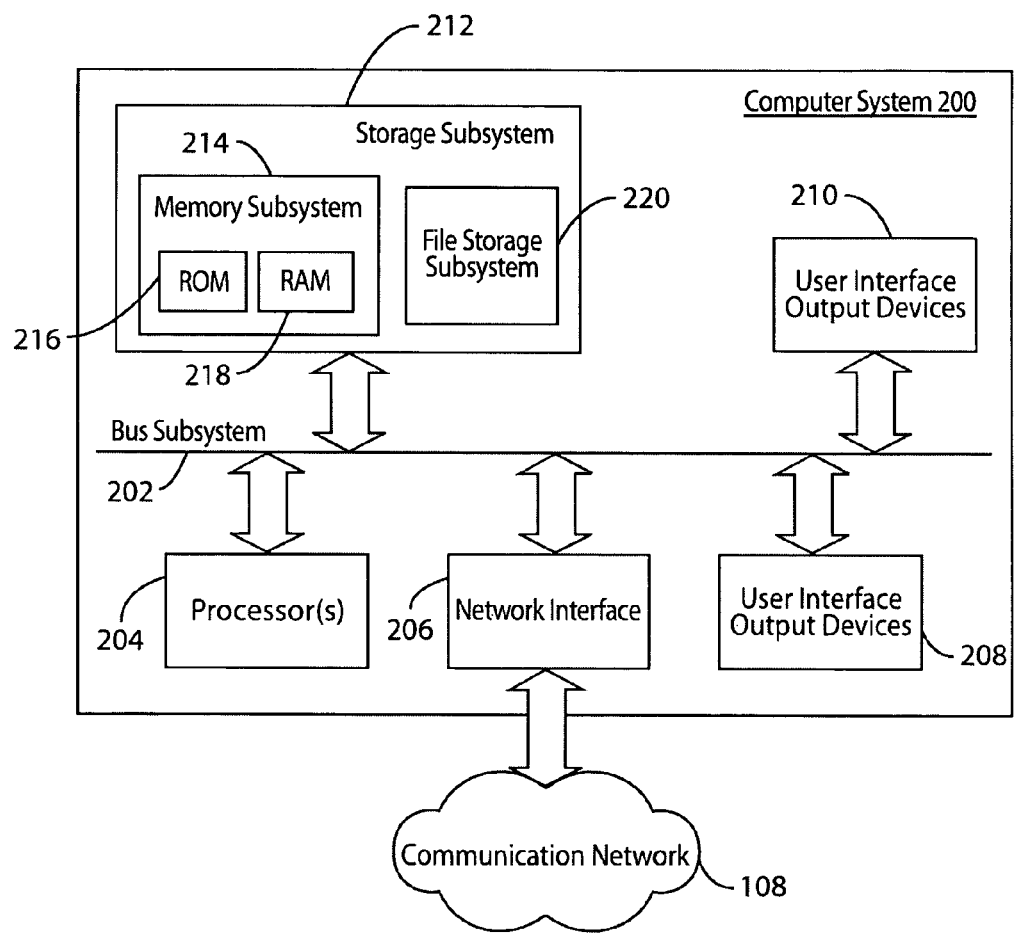
FIG. 2 is a simplified block diagram of an exemplary computer system according to an embodiment of the present invention.

FIG. 2 is a simplified block diagram of an exemplary computer system 200 according to an embodiment of the present invention. Computer system 200 may function as user system 104, as PVS 102 or as one of the computer systems which make up PVS 102, as PAS 106, or other like system. Computer system 200 typically includes at least one processor 204, which communicates with a number of peripheral devices via bus subsystem 202. These peripheral devices typically include a storage subsystem 212, comprising a memory subsystem 214 and a file storage subsystem 220, user interface input devices 210, user interface output devices 208, and a network interface subsystem 206. The input and output devices allow user interaction with computer system 200. It should be apparent that the user may be a human user, a device, a process, another computer, and the like. Network interface subsystem 206 provides an interface to outside networks, including an interface to communication network 108, and is coupled via communication network 108 to corresponding interface devices in other computer systems.

User interface input devices 210 may include a keyboard, pointing devices such as a mouse, trackball, touchpad, or graphics tablet, a scanner, a barcode scanner for scanning article barcodes, a touchscreen incorporated into the display, audio input devices such as voice recognition systems, microphones, and other types of input devices. In general, use of the term "input device" is intended to include all possible types of devices and ways to input information into computer system 200 or onto communication network 108.

User interface output devices 208 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 200 to a user or to another machine or computer system.

Storage subsystem 212 stores the basic programming and data constructs that provide the functionality of the computer system. For example, the various modules implementing the functionality of the present invention may be stored in storage subsystem 212 of PVS 102. These software modules are generally executed by processor(s) 204. In a distributed environment, the software modules may be stored on a plurality of computer systems and executed by processors of the plurality of computer systems. Storage subsystem 212 also provides a repository for storing the various databases storing information according to the present invention. Storage subsystem 212 typically comprises memory subsystem 214 and file storage subsystem 220.

Memory subsystem 214 typically includes a number of memories including a main random access memory (RAM) 218 for storage of instructions and data during program execution and a read only memory (ROM) 216 in which fixed instructions are stored. File storage subsystem 220 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers at another site on communication network 108. Information stored according to the teachings of the present invention may also be stored by file storage subsystem 220.

Bus subsystem 202 provides a mechanism for letting the various components and subsystems of computer system 200 communicate with each other as intended. The various subsystems and components of computer system 200 need not be at the same physical location but may be distributed at various locations within distributed network 100. Although bus subsystem 202 is shown schematically as a single bus, alternative embodiments of the bus subsystem may utilize multiple busses.

Computer system 200 itself can be of varying types including a personal computer, a portable computer, a workstation, a computer terminal, a network computer, a mainframe, or any other data processing system. Due to the ever-changing nature of computers and networks, the description of computer system 200 depicted in FIG. 2 is intended only as a specific example for purposes of illustrating the preferred embodiment of the computer system. Many other configurations of a computer system are possible having more or fewer components than the computer system depicted in FIG. 2. Client computer systems and server computer systems generally have the same configuration as shown in FIG. 2, with the server systems generally having more storage capacity and computing power than the client systems.

Figure 3:
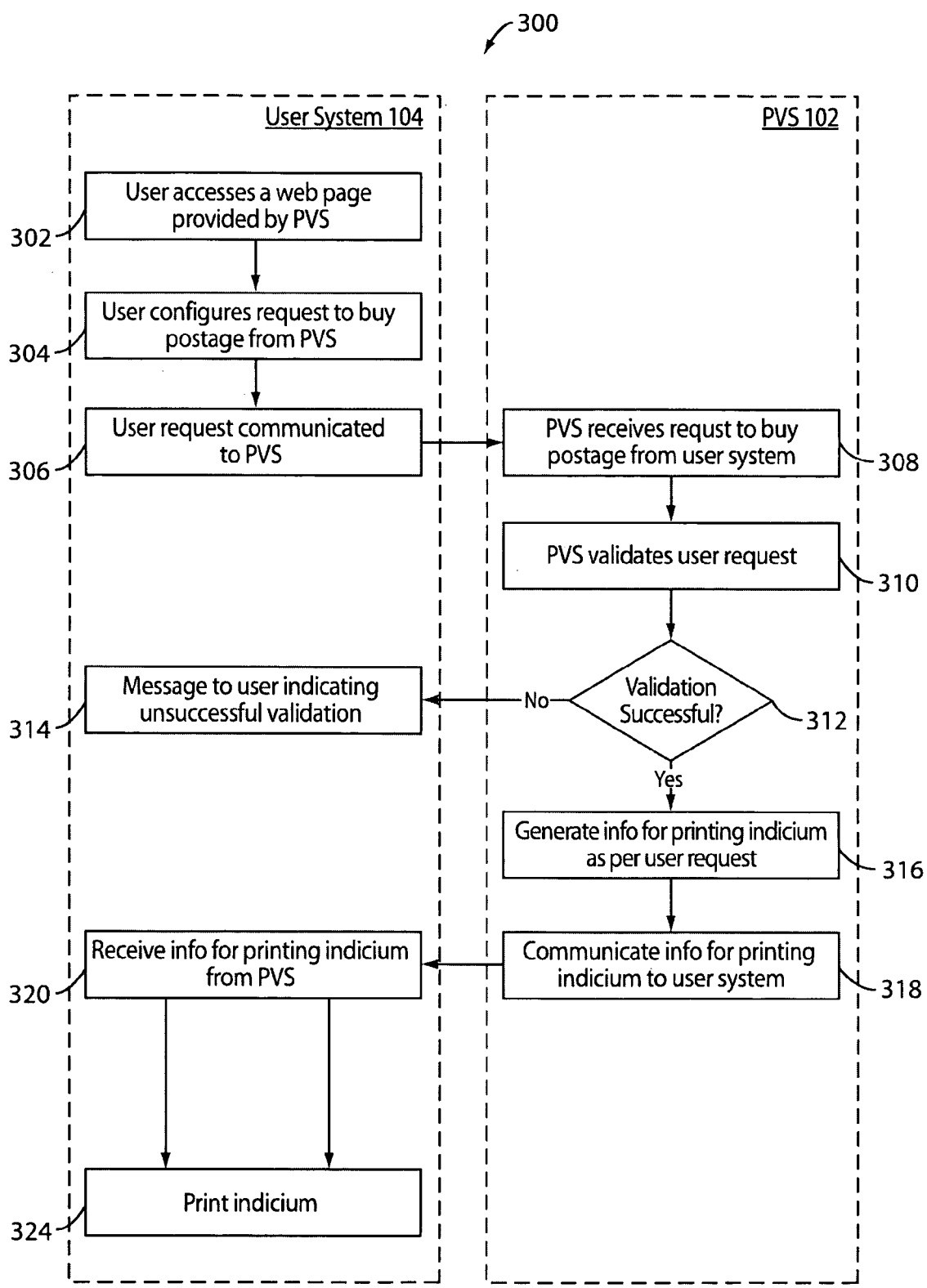
FIG. 3 is a simplified high-level flowchart showing processing performed by a user system and a postage vendor system for dispensing postage according to an embodiment of the present invention.

FIG. 3 is a simplified high-level flowchart 300 showing processing performed by user system 104 and PVS 102 for dispensing postage according to an embodiment of the present invention. As shown in FIG. 3, processing is generally initiated when a user accesses a web page provided by PVS 102 using user system 104 (step 302). As described above, the user may access PVS provided web pages by providing URL information corresponding to the web pages to the browser. Using the web page, the user may then configure a request to buy postage from PVS 102 (step 304). For example, the user may request purchase of one or more $0.33 stamps. The user may also use devices connected to user system 104 to configure the request. For example, a weighing scale connected to user system 104 may be used to provide information related to the weight of the mail piece for which postage is to be purchased.

According to an embodiment of the present invention, a user may be required to first register as a user of PVS 102 and open an account with PVS 102 before the user is allowed to buy postage from PVS 102. As part of this registration process, the user may be asked to provide information to PVS 102 such as information identifying the user, credit-card or other like information which may be used by PVS 102 to bill for postage purchased by the user, and other information related to the user. The information provided by the user may be stored by PVS 102 and a unique identifier may be assigned to the user to uniquely identify the user. The user may also be allowed to select a password to access the user's account. The user may also be allowed to configure user preferences related to postage buying activities. The user may also be allowed to store funds in the account which may be used for postage purchases. It should be apparent that in alternative embodiments of the present invention, the user may be allowed to buy postage from PVS 102 without opening an account or registering with PVS 102.

The user request may include information identifying the user, credit-card or other like information which will be used by PVS 102 to bill for the purchased postage, the amount and value/denomination of the postage which the user wishes to purchase, and other like information which may be used by PVS 102 to process the request. A single user request may request purchase of one or more stamps. If the user is a registered user and has a pre-established account with PVS 102, the user identification information may include a user identifier assigned by PVS 102 to the user during user registration. Further, for a registered user, PVS may use information provided by the user during the registration process for billing purposes, and consequently the credit-card or other like information may not be included in the user request.

The user request may also include other information related to the mail piece/package. For example, the user request may include information related to the weight of the mail piece/package which may be used by PVS 102 to compute the exact postage value required for mailing the mail piece/package. The weight information may be directly input by the user, or may be received from devices, e.g. weighing devices, coupled to user system 104. According to an embodiment of the present invention, the user request may also comprise information identifying the medium on which the indicium (or indicia) is to be printed. For example, if the indicium is to be printed on a label or a sheet of labels, the user request may include information, such as a serial number, associated with the label or sheet of labels. The serial number may be input by the user during step 304. Alternatively, information identifying the medium may be scanned and provided to user system 104. Further details related to the use of labels and sheets of labels are provided below.

User system 104 then communicates the user's request to purchase postage to PVS 102 via communication network 108 (step 306). According to an embodiment, a secure socket layer (SSL) connection may be established between user system 104 and PVS 102 to facilitate communication of information between user system 104 and PVS 102.

PVS 102 then receives the user request to purchase postage from user system 104 (step 308). PVS 102 may then validate the user request (step 310). For example, PVS 102 may determine if the credit-card information provided by the user is valid. PVS 102 may use services provided by companies such as Cybercash and Cybersource to perform the credit-card information validation. If the request is from a registered user who has a pre-funded account,, PVS 102 may determine if the user has sufficient funds in the user's account maintained by PVS 102 to satisfy the postage request. Alternatively, PVS 102 may determine if the credit-card information for the registered user is stored by PVS 102 or provided to PVS 102 by the user request. PVS 102 may also validate other information such as the identity of the user requesting the purchase, the serial number of the medium on which the postage indicium is to be printed, the type of postage requested by the user, and the like. If the validation process fails for any reason (step 312), the user's request may be terminated and a message may be communicated to the requesting user system 104 indicating that validation of the user request was not successful (step 314). A reason for why the validation failed may also be provided.

If validation is successful, PVS 102 then generates information for printing an indicium for each stamp requested in the user postage request (step 316). According to an embodiment of the present invention, the indicium related information generated by PVS 102 is along the lines specified in the IBIP specifications published by the USPS. For each indicium, the information for printing the indicium may include a bitmap of the indicium, a graphical image of the indicium, data representing the indicium, raw data corresponding to the indicium, or any other information which facilitates printing of the indicium. The information for printing the indicium is then communicated from PVS 102 to the requesting user system via communication network 108 (step 318).

The requesting user system 104 then receives the information for printing the indicium from PVS 102 (step 320). The information received in step 320 may then be used to print the indicium (step 324). For example, a printer device coupled to user system 104 may be used to print the indicium (or indicia). According to an embodiment of the present invention, user system 104 may process the information received from PVS 102 before printing the indicium according to step 324. The indicium may be printed on any suitable medium such as a label, paper, sheet of labels, envelopes, cards, directly on the mail piece/package, or other like media. One or more indicia may be printed at a time. In alternative embodiments of the present invention, the user may store the information for printing the indicia on a storage medium, such as a memory disk, for subsequent printing.

In order to reduce fraudulent imprinting of the indicium, the medium on which the indicium is printed may be configured to possess special features which provide enhanced security against fraudulent misuse. For example, the indicium may be printed on labels which may contain any or all of a variety of security features, such as bar-coding, micro-printing, watermarking, use of fluorescent strips, serrated edges, taggants, and the like. If the indicium is printed on a special medium e.g. secure paper, the user may be prompted to make the special medium available to the printer and follow instructions related to the special medium before the indicium is printed. For example, the user may be prompted to feed a sheet of labels to the printer before the indicium is printed and select one or more labels on which the indicia is to be printed. The indicium or indicia may then be printed on one or more labels which may then be affixed onto the mail piece/package (just like an ordinary stamp purchased from the post office).

Several different techniques may be used for printing the indicium (or indicia) according to step 324. According to an embodiment, a printer program e.g. a "print.dll", may be downloaded to the user system 104 from PVS 102. The printer program may contain information required by the printer for printing the indicium and may control the printer and other peripheral devices, for example, a weighing machine, coupled to user system 104. The print program may be downloaded automatically from PVS 102 to user system 104 at regular time intervals, or may be downloaded upon the occurrence of specific events such as when the information for printing the indicium or indicia is communicated to user system 104 or when PVS 102 determines that a newer version of the print program is available. After downloading, the print program may be configured to automatically execute when required to control the printer used for printing the indicium. The printer program may include, for example, a Java applet, a VBScript, a Java Script, ActiveX controls, a C++ program, a C program, a Java program, etc. which may be downloaded by the user or which may be automatically downloaded by PVS 102 to user system 104. In an embodiment of the present invention wherein the print program is a Java applet, the applet may be executed by the browser program when a user selects the option to print the indicium.

Figure 4:
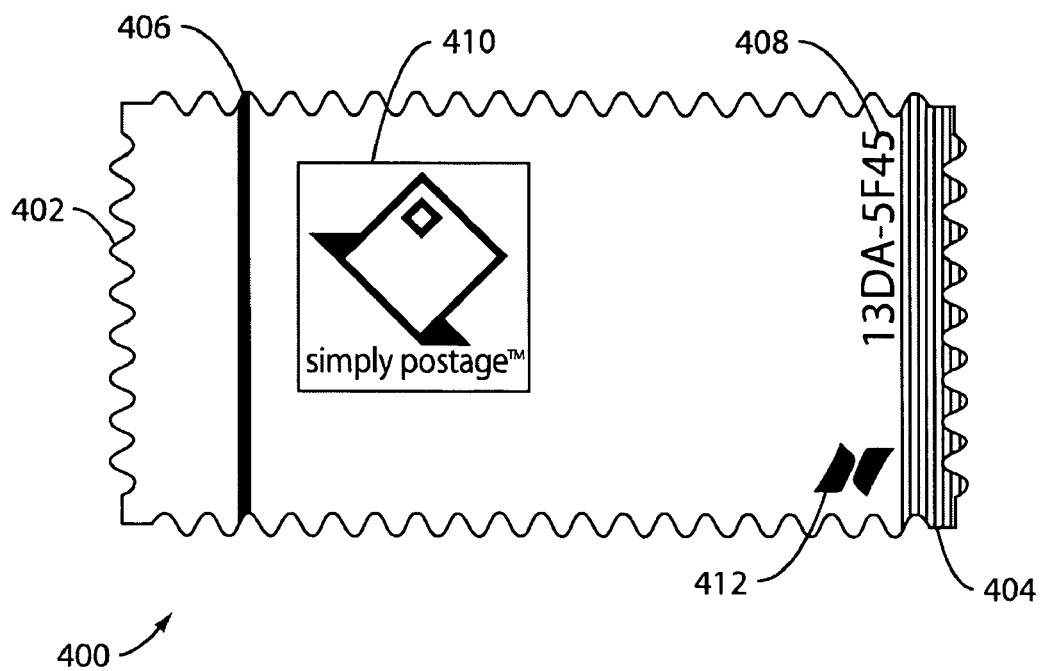
FIG. 4 depicts an exemplary individual pre-printed label on which an indicium may be printed according to an embodiment of the present invention.

As stated above, the indicium may be printed on a label, paper, or other like medium, or even on the mail piece/ package itself. FIG. 4 depicts an exemplary individual pre-printed label 400 on which the indicium may be printed according to an embodiment of the present invention. As shown in FIG. 4, label 400 has serrated edges 402 which not only serve as a security mechanism but also provide an aesthetic look and feel of a conventional U.S. postage stamp. Other security features imprinted on label 400 may include a colored stripe 404, lines of micro-print 406, a label serial number 408, a logo 410, and a watermark 412. These security features may be placed at different locations on label 400. The description of individual pre-printed label 400 depicted in FIG. 4 is intended only as a specific example for purposes of illustrating an embodiment of the present invention. Many other configurations of label 400 are possible having more or fewer features than those depicted in FIG. 4.

The security features shown in FIG. 4 are meant to reduce fraudulent copying or misuse of the label with the indicium printed on it. For example, colored stripe 404 may be in a color, for example, fluorescent pink, which cannot be easily copied by black and white copiers. Micro-print 406 may include the name of the postage vendor printed in an intricate manner. For example, micro-print 406 may contain the name "Neopost" printed repetitively.

Individual labels may be serialized for increased security and the serial number corresponding to each label may be printed on the label, e.g. serial number 408 depicted in FIG. 4. As part of configuring the user postage request (in step 304 of FIG. 3), the user may be required to enter the serial number of the label on which the indicium is to be printed. PVS 102 may maintain a list of all valid (available and unused) label serial numbers and serial numbers associated with labels may be invalidated by PVS 102 after indicia have been printed on the labels. In this manner, misuse or fraud can be detected if a label serial number received from the user refers to an invalidated serial number.

Logo 410 may display a logo of the postage vendor. In alternative embodiments, logo 410 displayed on label 400 may be selected or customized by the user purchasing the postage. Further, logo 410 need not be pre-printed on label 400, but may be downloaded to user system 104 along with the indicium or indicium data and then printed on label 400 (for example, during step 324 of flowchart 300 depicted in FIG. 3).

The different features printed on label 400 may be printed in special ink to further increase security. The paper on which label 400 is printed may itself be made of or contain special features to reduce fraudulent use. Further details related to the use of security features are discussed in U.S. application Ser. No. 09/611,375 filed Jul. 7, 2000, the entire disclosure of which is herein incorporated by reference for all purposes.

Figure 5:
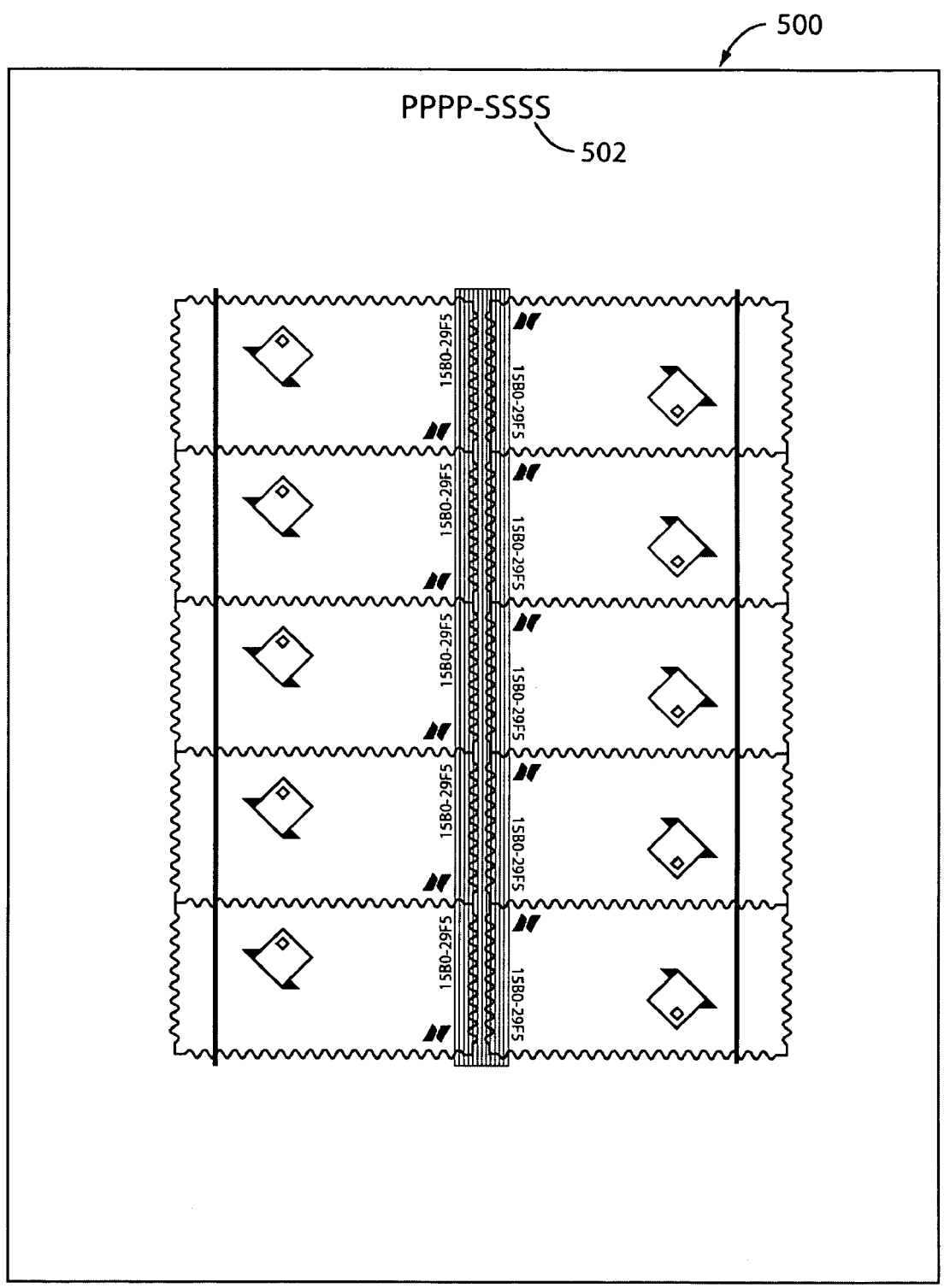
FIG. 5 depicts a sheet of pre-printed labels according to an embodiment of the present invention.

FIG. 5 depicts a sheet 500 of pre-printed labels according to an embodiment of the present invention. As shown in FIG. 5, sheet 500 comprises ten individual pre-printed labels depicted in FIG. 4. The number of individual labels on a sheet may vary in alternative embodiments of the present invention. Individual sheets may be serialized for increased security and a unique serial number corresponding to each sheet may be printed on the sheet, e.g. sheet serial number 502.

As part of configuring the user postage request, the user may be required to enter the unique serial number of the sheet on which the indicium is to be printed. PVS 102 may maintain a list of all available and valid sheet serial numbers and the number of unused labels corresponding to the sheets. After all the labels on a particular sheet have been used, the unique sheet serial number corresponding to the particular sheet may be invalidated by PVS 102. In this manner, misuse or fraud can be detected if the sheet serial number received from the user refers to an invalidated sheet serial number. According to an embodiment of the present invention, label serial number 408 printed on each label of a sheet may be the same as sheet serial number 502. In alternative embodiments, the sheets of labels may be serialized using a first set of numbers, and each of the labels on the sheets may themselves be serialized using a second set of numbers. Serializing both the sheets and the labels provides for increased security.

Figure 6:
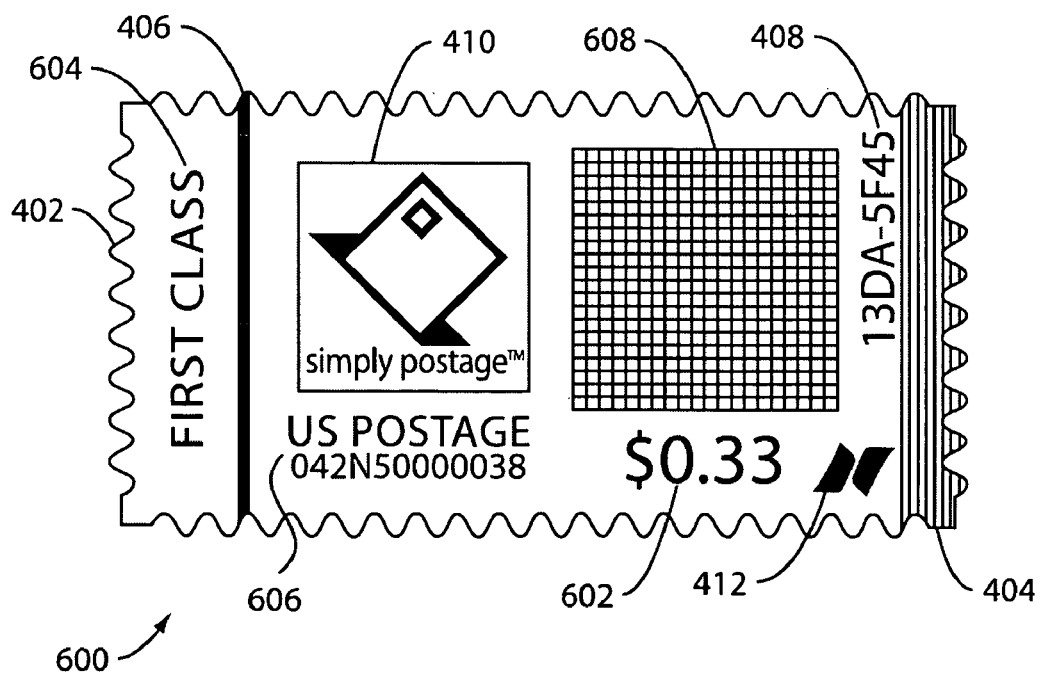
FIG. 6 depicts an individual label with an indicium printed on it according to an embodiment of the present invention.

FIG. 6 depicts an individual label 600 with an indicium printed on it according to an embodiment of the present invention. In addition to features of a blank label (described above with respect to FIG. 4), label 600 has an indicium printed on it which may include human readable information and machine readable information. For example, the human readable information of the indicium may include the postage amount or value 602 (e.g. $0.33), the mail class 604 of the postage (e.g. FIRST CLASS), and number 606 (e.g. 042N5DD00038) corresponding to a PSD resource from the pool of PSD resources on PVS 102 which was used to generated the information for printing the indicium. Further details related to the use of PSD resources for generating information for printing the indicium are provided below.

The machine readable portion of the indicium may include a two-dimensional code 608, which may be for example a PDF-417 barcode format, a DataMatrix format, or other format. According to an embodiment of the present invention, two-dimensional code 608 is DataMatrix. The particular contents of the two-dimensional code 608 will be discussed below. According to an embodiment of the present invention, the indicium and the positioning of the indicium on label 600 conform generally to specifications described in the IBIP specifications.

Figure 7:
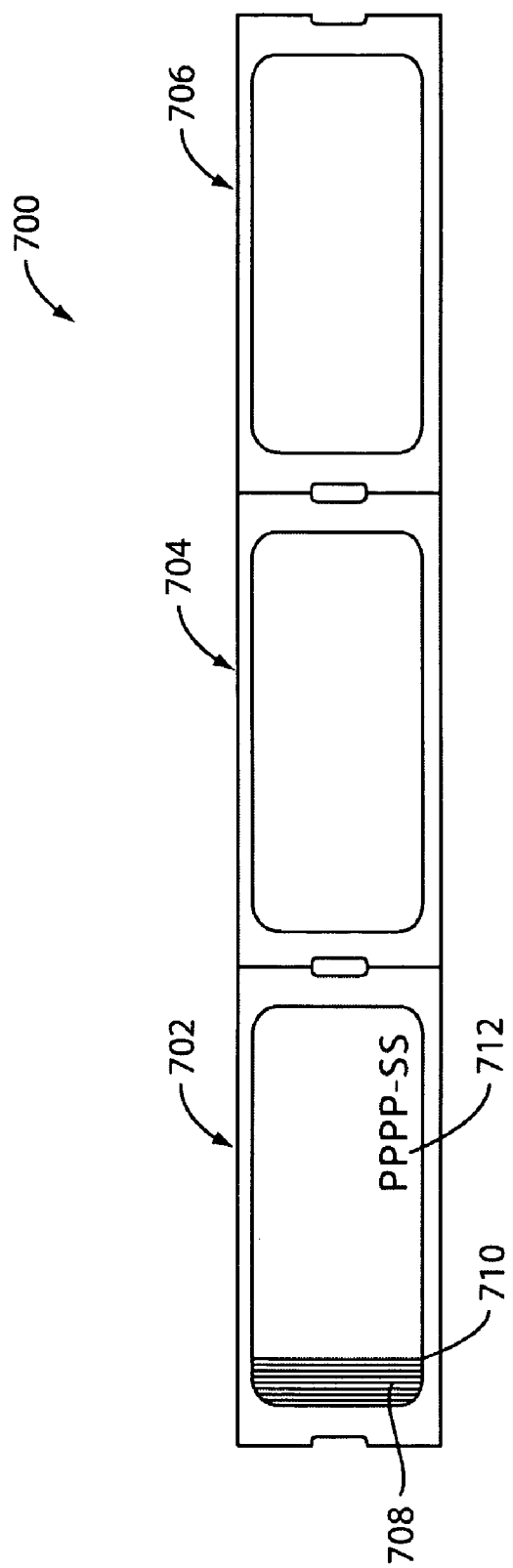
FIG. 7 illustrates an example of a roll of postage labels of yet another embodiment of the present invention.

FIG. 7 illustrates an example of a roll of postage labels of one embodiment of the present invention. In FIG. 7, a roll of postage labels 700 of which three are illustrated, 702, 704 and 706. Each postage label, for example, includes a pink/red colored stripe 708, a line or lines of microprint 710, and a individual label serial number 712. In this embodiment, the individual label serial number 712 is the same as the sheet serial number representing the roll of postage label stamps and may be used to validate or authenticate the labels for printing indicia thereon.

Figure 8:
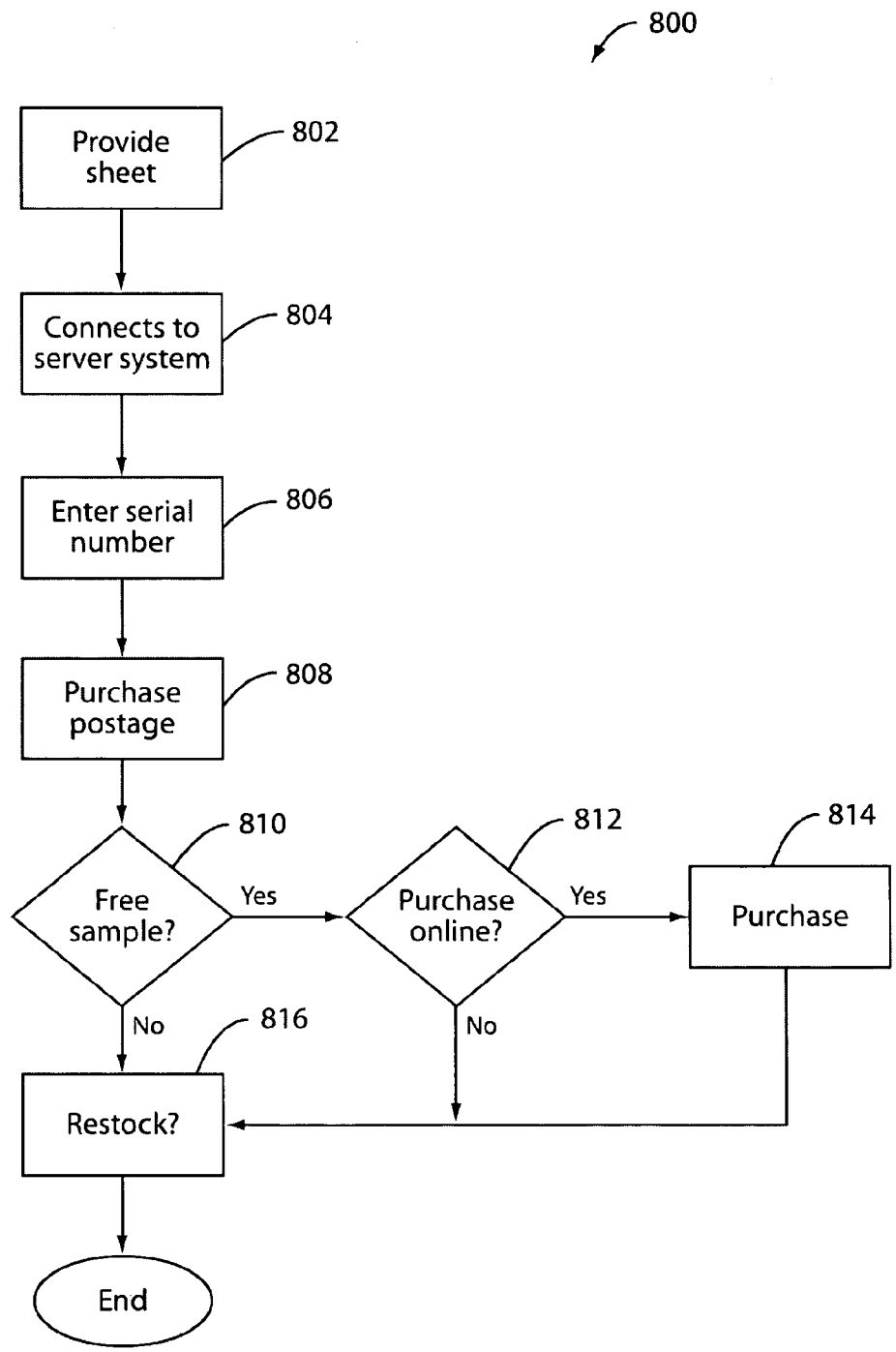
FIG. 8 illustrates an example process flow of another embodiment of the present invention.

FIG. 8 illustrates an exemplary process flow 800 of providing stamps over a communication network according to one embodiment of the present invention. Among other features, the process 800 describes a method of distributing postage label sheets to users to facilitate purchasing of stamps over a network. Initially one or more postage label sheets or postage media having one or more security features are provided to a user (step 802). As explained previously, the security features may include some or all of the following: serrated edges 402, a colored strip 404, a line or lines of microprint 406, a label serial number 408, a logo 410, a watermark 412, and a sheet serial number 502. The label sheet may be sold or given to the user. In some instances, the label sheet or a package thereof is provided to the user by selling it to the user via an online vendor, such as Neopost Inc., or through a brick and mortar store, such as Office Depot. In other instances, the label sheets are provided to users as free samples. For example, free samples of label sheets may be provided to users by mass mailing, inserting them into newspapers, and bundling them with products such as printers, computers, and the like. In addition, the free samples may also be provided at a doctor's office, office supply stores, convenience stores, banks, postal offices, supermarkets, and other intermediaries, so that people may have easy access to sample label sheets for their use. As used herein, the term "intermediary" refers to an entity that directly interfaces with the public to provide them with sample label sheets.

At a step 804, the user connects onto the server system or PVS 102 with the user system 104, using the methods similar with as those described in connection with FIG. 3. As used herein, the term "postage service provider" refers to an entity that provides services that enable a user to purchase a postage stamps, e.g., over a network. The server system is run and managed by a postage service provider such as Neopost Inc. Generally, before allowing the user to connect onto the server, the user is required to enter his or her unique identification information, e.g., a user ID and password, if the user is a registered member. On the other hand, if the user is not a registered member, the user is required to apply to be a registered member or connect onto the server as a guest user, as is well known in the art.

Next the user sends the serial number 408 on the label sheet to validate the label sheet (step 806). Alternatively, if the label sheet has a sheet serial number 502 (FIG. 5) in addition to the label serial number, the sheet serial number may be sent in place of the label serial number. However, for purpose of convenience, as used hereinafter, the term "serial number" or "identifier code" will be used to describe the embodiments of the invention, but the term may refer to the label serial number or the sheet serial number, or both. The label serial number is unique to each label sheet so that any particular label sheet can be identified by its label serial number. Furthermore, even if the label serial numbers differ from the sheet serial number, either serial number will uniquely identify the sheet.

In one embodiment, the term "identifier code" is used more broadly than the term "serial number," where the latter refers to numbers, symbols or characters, i.e., label or sheet serial number, that are used as a security feature to validate the associated medium. Consequently, each label or sheet has a unique label or sheet serial number. In comparison, the "identifier code" refers to numbers, symbols or characters that identifies the associated medium for any purposes including for purposes other than to authenticate the medium. In this regard, the same identifier code may be assigned to a plurality of labels or sheets to identify them as a certain type of labels or sheets.

As explained herein, this characteristic of the serial number to distinguish one label sheet from another may be used to provide better customer relation management, e.g., facilitate distribution of label sheets to the users for purchase of stamps over a communication network. In some embodiments, it is sufficient merely to distinguish one group of label sheets from others in order to provide better services to the customers. In this regard, for each serial number, information relating to the label sheet may be stored in a database accessible by the PVS 102. Alternatively, such information is stored on the database for only selected serial numbers. In other embodiments, a plurality of serial numbers may share the same information, i.e., multiple serial numbers may be grouped into different groups, where those serial numbers in the same group have substantially the same information.

In one embodiment, the information stored in the database in connection with each serial number may include one or more of the following: (1) whether the label sheet has been distributed as a free sample or sold to the user, (2) if distributed freely, the information on the intermediary, (3) if sold, the information on the vendor, (4) the initial geographic location where the label sheet was made available to the public, (5) the sequence of the label sheet within a packet or a given supply of the label sheets, and the like. In one embodiment, this information relating to the sequence of the label sheet is used to determine whether an additional supply of label sheets is required by the users or clients, as explained in greater detail below. The information above relating to the serial number is used to better manage relations with customers, and as such is referred hereinafter as a customer-relation-management (CRM) information. Such information may include one or several individual data elements. Furthermore, depending on the nature of the database, data elements common to many sheets may only be stored once.

Once the label sheet has been authenticated upon entering the serial number, the stamp is purchased using the procedure described previously in connection with FIG. 3 (step 808). Subsequently, the process 800 determines whether or not the label sheet used to purchase the stamps is a label sheet that has been distributed freely to the user (step 810). In one embodiment, the determination is done by retrieving and examining the CRM information corresponding to the entered serial number. In another embodiment, the determination is done on the fly by examining the entered serial number. For example, label sheets that are distributed as free samples may be assigned serial numbers that begin with "F" to indicate that they are samples distributed freely to the users. In this way, a program running in the client or server system may make the determination as to whether the label sheet has been purchased or not without retrieving and examining the CRM information.

At step 810, if the label sheet has been determined to be distributed as a sample, the user is asked if he or she would like to make an online purchase of additional label sheets for future use (step 812). Generally, label sheets are sold as a package containing a dozen or more label sheets. If the user agrees to purchase the sheets online, the purchase is consummated using one of the methods known in the art (step 814). Thereafter, the process 800 is directed to a step or sub-process 816 to determine whether or not the user, vendor, or intermediary requires additional supply of the label sheet, as explained in more detail below. At step 810, if the label sheet has determined not to have been freely distributed, the process 800 is directed immediately to the step or sub-process 816. In another embodiment, the steps 810–816 are performed before the postage purchasing step 808.

Figure 9:
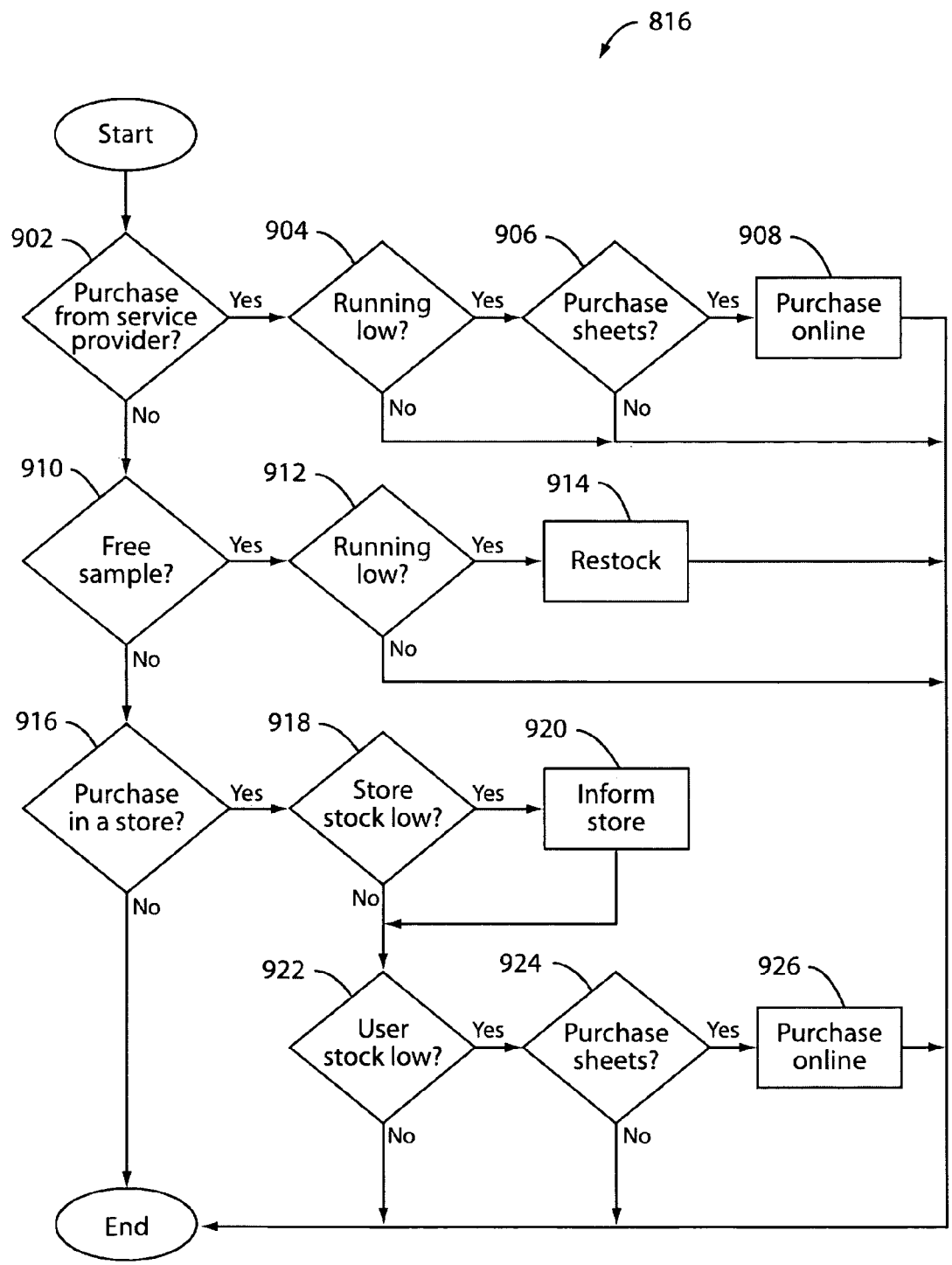
FIG. 9 illustrates an example sub-process flow of embodiments of the present invention.

FIG. 9 illustrates the sub-process 816 for determining whether the user, vendor, and/or intermediary are running low on their supply of label sheets, according to one embodiment of the present invention. The sub-process determines whether or not the label sheet has been purchased from the postage service provider such as Neopost Inc. (step 902). This is determined by retrieving the CRM information stored in the database that corresponds to the serial number sent to the server system by the user at step 806. If so, it is determined whether the user's supply of the label sheet is running low and requires an additional supply (step 904). In one embodiment, the CRM information corresponding to the serial numbers of the last few sheets of the package that the user had purchased are flagged. This generally provides a good indication as to when the supply of label sheets is running low since users typically use the label sheets in sequence. Therefore, as the user uses the label sheets in sequence, he or she eventually uses one of the sheets whose serial number's CRM information is flagged. When this serial number is entered or sent to the server system at step 806 described above, the sub-process 816 is alerted that the user's supply of the label sheet is running low and requires replenishing. Alternatively, the determining step above (step 904) may be performed on the fly by examining the serial number or identifier code. For example, the last few label sheets of all packets may be identified with a serial number starting with "L" to indicate the supply is running low, thereby eliminating the need for retrieving the CRM information corresponding to the serial number or identifier code to perform the determining step in question.

Once the sub-process 816 determines that the user's supply of label sheets is running low, the user is prompted if he or she would like to purchase additional label sheets for future use (step 906). If the user agrees to purchase the label sheets, the purchase is consummated using anyone of the well known methods (step 908), and the sub-process ends. If not, the sub-process skips the step 908 and ends. The sub-process also ends if the sub-process determines that the user's supply of the label sheet is not running low.

The sub-process also determines whether or not the label sheet used by the user has been obtained as a free sample based on the serial number entered at step 806 (step 910). If so, the CRM information corresponding to the serial number is checked to determine the identity of the intermediary that had provided the label sheet and whether or not the supply of label sheets at the intermediary's place, e.g., a doctor's office, is running low and requires restocking (step 912). As in step 904, the CRM information corresponding to the serial numbers of the last few sheets (some designated number X) of the originally supplied label sheets are flagged to indicate that the supply at the doctor's office is running low if one of those serial numbers is entered by a user. If the supply of the label sheets has been determined to be running low, necessary actions are performed so that another stack of the label sheets will be sent to the doctor's office in question (step 914). In one embodiment, an e-mail is sent to a division within the service provider instructing them to ship one or more additional stacks of label sheets to the doctor's office, or to prompt a person affiliated with the division to call the doctor's office to ask if the doctor's office requires an additional supply of label sheets. Again the CRM information corresponding to the last number X of the label sheets being sent to the doctor's office are flagged to indicate when the supply is running low. Alternatively, the determination step 912 may be done on the fly, as explained previously. In this way, the intermediaries like the doctor's office, will be consistently supplied with a sufficient number of label sheets to be distributed to the public.

In addition, the sub-process determines whether or not the label sheet used by the user has been purchased from a vendor other than the service provider (Neopost) based on the serial number entered at step 806 (step 916). If so, the CRM information corresponding to the serial number is checked to see if it indicates that the vendor's supply of label sheets is running low (step 918). In one embodiment, the CRM information corresponding to the serial numbers of selected packets of label sheets are flagged to indicate that the vendor's supply of label sheets is running low if one of those serial number is entered at step 806. The vendors are also instructed to stock their store with the selected packets of label sheets after all other packets have been used. For this purposes, the selected packets may be packaged separately from other packets using a distinctive wrapping to separate them from other packets and having specific instructions written thereon, e.g., "Please stock these last."

At a step 920, if the vendor's stock is indicated to be running low, an action appropriate to remedy this situation is performed. In one embodiment, an e-mail is sent to a person within the service provider of this fact. Subsequently, a call is placed to the vendor to see if they require additional supply of label sheets. Alternatively, the sub-process may prompt an e-mail or letter to be prepared automatically and sent to the vendor informing them of possible shortage of the supply of label sheets.

After checking whether or not the vendor's supply of label sheets is low, the user's supply is checked to see if it is running low (step 922). As in step 904, this is also performed by examining the serial number entered at step 806. If the supply is deemed to be low, the user is asked if he or she would like to purchase additional label sheets for future use (step 924). If the user agrees, the purchase is made (step 926). If not, the sub-process terminates.

Figure 10:
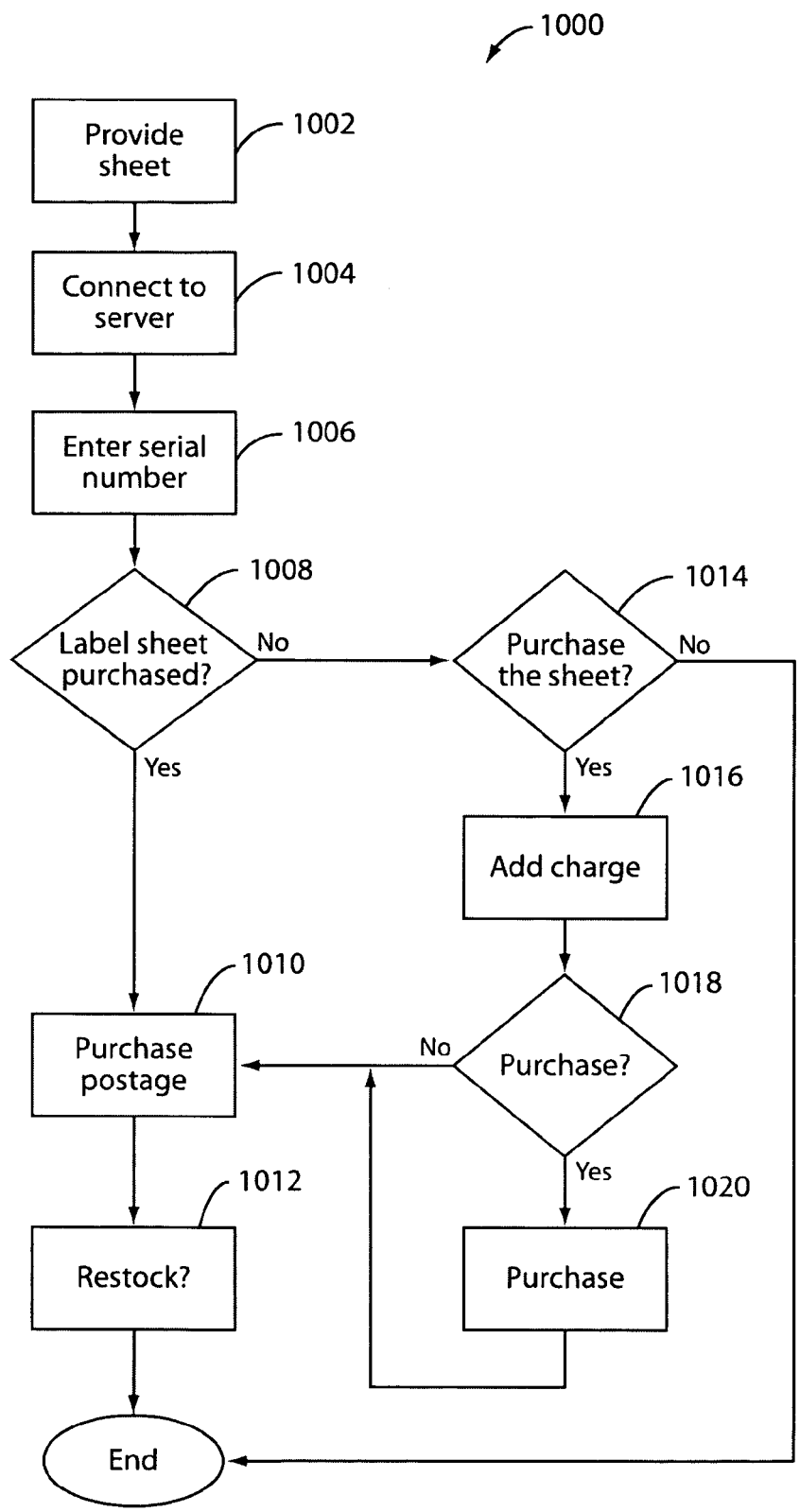
FIG. 10 illustrates an example process flow of yet another embodiment of the present invention.

FIG. 10 illustrates an exemplary process flow 1000 of distributing postage label sheets to be used in purchasing stamps over a communication network according to one embodiment of the present invention. Among other features, the process 1000 allows users to obtain sample label sheets from intermediaries and pay for the sheets later when they attempt to purchase the stamps over a network. Initially, one or more label sheets are provided to a user (step 1002). The label sheet may be sold or given to the user, as explained above in connection with the process 800. The user connects to the server system (step 1004). The user sends the serial number of the label sheet he or she proposes to use to purchase the stamps (step 1006). For each serial number, CRM information relating to the serial number is stored in a database accessible by the PVS.

When the server or PVS 102 receives the serial number, the server accesses the CRM information to determine whether or not the label sheet has been sold to the user (step 1008). If the sheet has been sold, the process 1000 continues on to consummate the purchase of stamps over the communication network (step 1010). If not, the process informs the user that the label sheet has been provided by an intermediary and needs to be purchased to validate the label sheet. The user is prompted if he or she wishes to purchase the label sheet for some amount, e.g., $0.25, to continue with the process 1000 and purchase the stamps. If the user refuses, the process terminates (step 1014). If not, he or she is charged the agreed upon price for the label sheet (step 1016). Subsequently, the user is prompted if he or she would like to purchase additional label sheets for future use. If the user agrees, the purchase is made (step 1020) and then the process continues on at step 1010. If not, the process goes directly to step 1010 to continue with the purchase of the stamps. The sub-process 1012 is performed to determine whether the user, vendor, and/or intermediary require additional supply of label sheets, as explained previously in connection with the sub-process 812.

Figure 11:
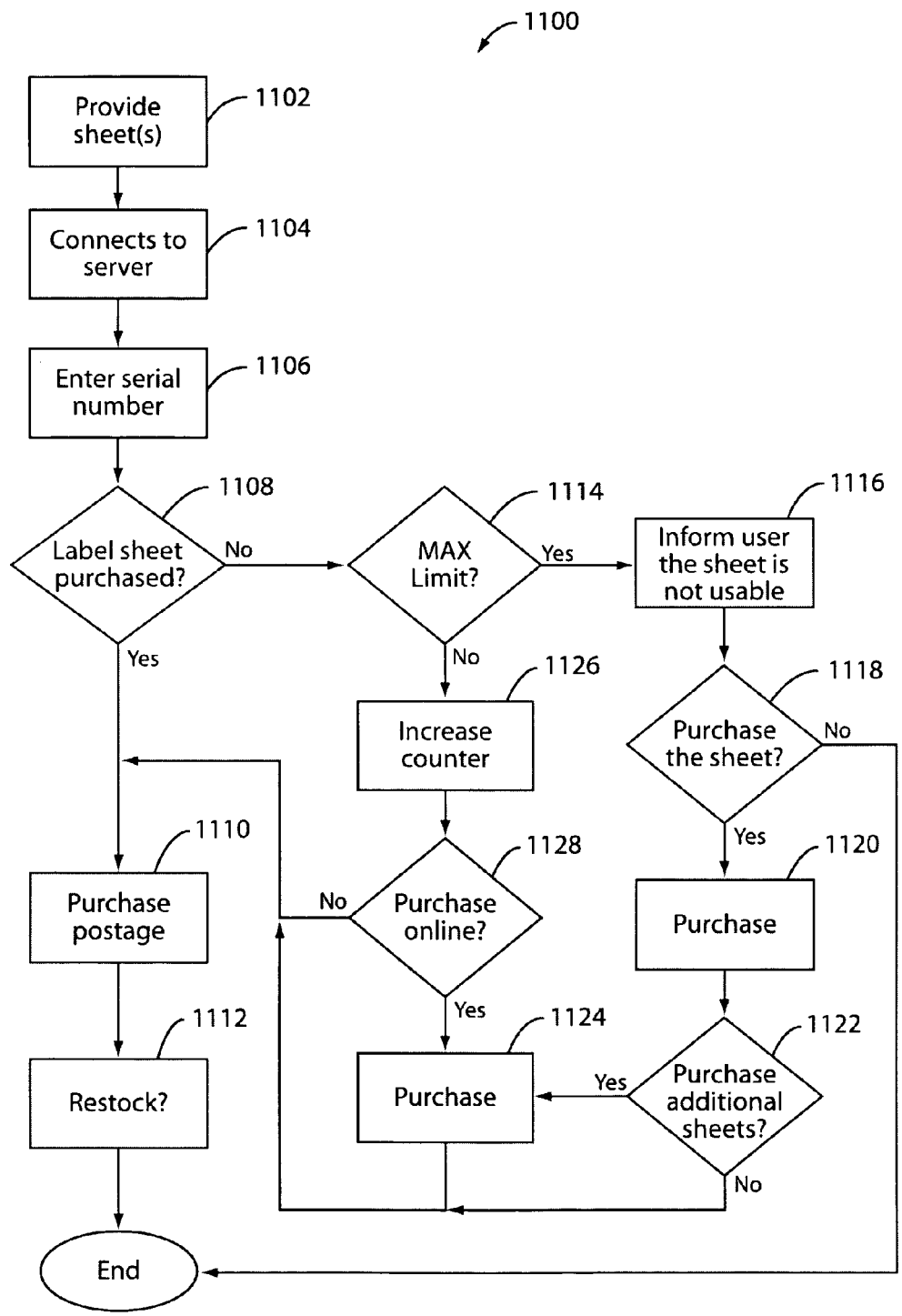
FIG. 11 illustrates an example process flow of yet another embodiment of the present invention.

FIG. 11 illustrates an exemplary process flow 1100 of distributing postage label sheets to be used in purchasing stamps over a communication network according to another embodiment of the present invention. Among other features, the process 1100 limits each user's use of free label sheets to a given number, e.g., three sheets, so that free samples of label sheets are used primarily to introduce the stamp purchase service to new users, and not to provide endless supply of free label sheets to existing users. Initially, one or more label sheets are provided to a user (step 1102). The label sheet may be sold or given to the user, as explained above in connection with the process 800. The user connects to the server system (step 1104). The user sends the serial number of the label sheet he or she proposes to use to purchase the stamps (step 1106). For each serial number, CRM information relating to the serial number is stored in a database.

When the server or PVS 102 receives the serial number, the server accesses the CRM information to determine whether or not the label sheet has been sold to the user, i.e., not provided free to the user via an intermediary (step 1108). If so, the process 1100 proceeds to consummate the purchase of stamps over the communication network (step 1110). Thereafter, sub-process 1112 is performed to determine whether or not the user, vendor, and/or intermediary require additional supply of label sheets, as explained above in the sub-process 812.

If the label sheet is determined not to have been purchased, the process determines whether or not the user has already used three free samples of label sheets, the maximum allotted free samples per person according to one embodiment of the invention (step 1114). In one embodiment, this is accomplished by assigning a counter to each user and incrementing it by one each time the user uses a free label sheet to purchase stamps. If it is determined that the user has already used three sample label sheets, he or she is informed that he or she can no longer use the sample label sheets without purchasing it (step 1116). The user is prompted if he or she wishes to purchase the label sheet in question for some amount, e.g., $0.025, in order to proceed with the purchase of stamps (step 1118). If the user agrees, the purchase is consummated (step 1120). The user is subsequently prompted if he or she would like to purchase additional label sheets for future use (step 1122). If the user agrees, the purchase is made (step 1124), and the process 1100 continues onto step 1110 to purchase the postage. If not, the process continues onto step 1110 directly.

At step 1114, if the user has not yet used three free label sheets, the user is allowed to used the label sheet to purchase the stamps without purchasing it. A counter assigned to the user is incremented by one accordingly (step 1126). Thereafter, the user is prompted if he or she would like to purchase additional label sheets for future use (step 1128). If the user agrees, the purchase is made (step 1124), and the process continues onto step 1110 to purchase the stamps. If the user does not, the process moves directly to step 1110 to proceed with the stamp purchase.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method of providing a value stamp over a communication network, comprising:

receiving from a user via the communication network an identifier code of a medium to be used to purchase a value stamp, the medium being suitable for printing a value indicium thereon, the identifier code identifying the medium;

accessing a database using the identifier code received from the user, the database including first and second identifier codes that are associated with first and second customer-relation-management (CRM) information, respectively;

performing a specific action according to a result of the accessing step, wherein a first action associated with the first CRM information is performed if the identifier code received from the user corresponds to the first identifier code stored in the database and a second action associated with the second CRM information is performed if the identifier code received from the user corresponds to the second identifier code stored in the database, and determining whether or not the user has already used a maximum allotted free medium if the first CRM information indicates that the medium has been distributed as a free sample, causing the value indicium to be printed on the medium to generate a value stamp if the medium has been previously purchased or if the user has not yet used the maximum allotted free medium.

2. The method of claim 1, wherein the first CRM information indicates that the medium is a medium that has not been purchased by the user, the first action involving prompting the user to decide whether the user wishes to purchase the medium for some amount.

3. The method of claim 2, wherein the medium is a postage label sheet having a plurality of labels.

4. The method of claim 3, wherein a plurality of value indicia are printed on the plurality of labels to generate a plurality of value stamps.

5. The method of claim 1, wherein the first action involves determining whether an affiliate of a service provider requires an additional supply of the medium by examining the identifier code received from the user, wherein the affiliate is the user or a provider of the medium to the user, and wherein the service provider is an agent authorized to provide the value stamp to the user.

6. The method of claim 1, the method further comprising:

generating new customer-relation-management (CRM) information at least for the identifier code of the medium;

storing the generated CRM information in the database, wherein the database includes CRM information corresponding to a plurality of media; and retrieving the CRM information corresponding to the identifier code received from the user, wherein the retrieved CRM information is used to determine whether the affiliate requires the additional supply of the medium.

7. The method of claim 5, wherein the value indicium is a postage indicium.

8. The method of claim 5, wherein the identifier code is a label serial number or a sheet serial number and is used to authenticate the medium.

9. The method of claim 5, wherein the identifier code enables one group of media to be differentiated from another group.

10. The method of claim 1, wherein the first CRM information indicates that the medium is a medium that has been distributed as a free sample, the first action involving displaying a message asking the user if he or she wishes to obtain an additional medium.

11. The method of claim 1, wherein the first action involves determining whether or not restocking of medium is needed by the user.

12. The method of claim 1, wherein the first action involves determining whether or not to allow the user to use the medium to purchase a value stamp over the network, the method further comprising:

determining whether or not the medium has been previously purchased; and if not purchased previously, requiring the user to purchase the medium or commit to purchasing a medium before allowing the user to use the medium to purchase the value stamp over the network.

13. A method of providing a value stamp over a communication network, comprising:

generating customer-relation-management (CRM) information corresponding to an identifier code of a medium to be distributed to a user, the medium being suitable for printing a value indicium thereon to produce a value stamp, the identifier code being suitable for distinguishing the medium from at least one other medium;

storing the generated CRM information in a database system, wherein the database system includes CRM information corresponding to a plurality of media;

providing the medium to a user having access to a data processing system;

receiving from the user over the network the identifier code of the medium to be used to purchase a value stamp;

retrieving the CRM information corresponding to the identifier code;

determining whether or not the user has already used a maximum allotted free medium if the CRM information indicates that the medium has been distributed as a free sample, causing the value indicium to be printed on the medium to generate a value stamp if the medium has been previously purchased or if the user has not yet used the maximum allotted free medium.

14. The method of claim 13, further comprising:

determining whether an affiliate of a service provider requires an additional supply of the medium upon examining the identifier code, wherein the affiliate is the user or a provider of the medium to the user, and wherein the service provider is an agent authorized to provide the value stamp to the user.

15. The method of claim 13, further comprising:

determining whether or not the medium has been previously purchased; and if not purchased previously, requiring the user to purchase the medium before allowing the user to use the medium to purchase the value stamp over the network.

16. The method of claim 13, wherein the identifier code is additionally used as a security feature of the medium to authenticate the medium.

17. A method of providing a postage medium to a user for use in purchasing a value stamp over a communication network, the method comprising:

generating customer-relation-management (CRM) information corresponding to a serial number of a medium to be distributed to a user, the medium being suitable for printing a value indicium thereon, the serial number uniquely identifying the medium;

storing the generated CRM information in a database system, wherein the database system includes CRM information corresponding to a plurality of media;

providing the medium to a user having access to a data processing system;

receiving from the user over the network the serial number of the medium to be used to purchase a postage stamp;

retrieving the CRM information corresponding to the serial number; and determining whether an affiliate of a postage service provider requires an additional supply of the medium upon examining the serial number, wherein the affiliate is the user or a provider of postage medium to the user, and wherein the service provider is an agent authorized to provide the postage stamp to the user, determining whether or not the user has already used a maximum allotted free medium if the first CRM information indicates that the medium has been distributed as a free sample, causing the value indicium to be printed on the medium to generate a value stamp if the medium has been previously purchased or if the user has not yet used the maximum allotted free medium.

18. The method of claim 1, wherein the step of determining whether or not the user has already used the maximum allotted free medium further comprising: assigning a counter to each user; and incrementing it by one each time the user uses a free label sheet to purchase stamps.

* * * * *